United States Patent
Izumi

(10) Patent No.: US 7,697,784 B2
(45) Date of Patent: *Apr. 13, 2010

(54) METHOD FOR REDUCING NOISE IN IMAGES

(75) Inventor: Keisuke Izumi, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 1185 days.

This patent is subject to a terminal disclaimer.

(21) Appl. No.: 11/273,706

(22) Filed: Nov. 14, 2005

(65) Prior Publication Data

US 2006/0104538 A1 May 18, 2006

(30) Foreign Application Priority Data

Nov. 12, 2004 (JP) ............................. 2004-329260

(51) Int. Cl.
*G06K 9/40* (2006.01)
*H04N 5/00* (2006.01)

(52) U.S. Cl. .................. 382/275; 382/260; 382/261; 382/264; 348/606; 348/607

(58) Field of Classification Search .......... 382/260–275
See application file for complete search history.

(56) References Cited

U.S. PATENT DOCUMENTS

| 5,479,211 A * | 12/1995 | Fukuda ................. 375/240.03 |
| 5,497,249 A * | 3/1996 | Koizumi et al. ............. 358/462 |
| 5,920,356 A * | 7/1999 | Gupta et al. ................ 348/606 |
| 5,959,693 A * | 9/1999 | Wu et al. ..................... 348/624 |
| 6,360,024 B1 * | 3/2002 | Tan et al. ..................... 382/260 |
| 6,459,734 B1 * | 10/2002 | Kato et al. ............. 375/240.12 |
| 6,535,254 B1 * | 3/2003 | Olsson et al. ................ 348/607 |

(Continued)

FOREIGN PATENT DOCUMENTS

JP 8-205157 8/1996

(Continued)

OTHER PUBLICATIONS

Patent Abstracts of Japan, Publication No. 08-205157, publication date Aug. 9, 1996, 35 pages.

(Continued)

*Primary Examiner*—Aaron W Carter
*Assistant Examiner*—Gandhi Thirugnanam
(74) *Attorney, Agent, or Firm*—Oshia • Liang LLP

(57) ABSTRACT

There is provided a method of reducing block noise, mosquito noise and other image noises in an image by a filtering process using a smoothing filter, which block noise, mosquito noise and other image noises being caused at the time of decoding encoded, compressed image data on a block-by-block basis. The method includes changing the extent or intensity of the image noise reduction in the filtering process in a continuous or stepwise manner according to an output size or expansion rate of an image to be outputted to printer paper, photographic paper or other output media, thereby allowing the extent or intensity of the image noise reduction to be increased as the output size or expansion rate of the image increases. This method is capable of allowing the extent of the image noise reduction applied to image data to be perceived in a similar fashion, irrespective of the output size.

7 Claims, 14 Drawing Sheets

U.S. PATENT DOCUMENTS

| | | |
|---|---|---|
| 6,795,588 B1 * | 9/2004 | Nio et al. ............... 382/261 |
| 6,895,120 B2 * | 5/2005 | Satoh et al. ............. 382/240 |
| 6,983,078 B2 * | 1/2006 | Baggs ..................... 382/275 |
| 7,003,174 B2 * | 2/2006 | Kryukov et al. .......... 382/266 |
| 7,054,503 B2 * | 5/2006 | Ishikawa ................. 382/275 |
| 7,064,865 B2 * | 6/2006 | Ishikawa ................. 358/1.9 |
| 7,409,103 B2 * | 8/2008 | Nishi et al. .............. 382/275 |
| 7,415,163 B2 * | 8/2008 | Nishi et al. .............. 382/275 |
| 2002/0172431 A1 * | 11/2002 | Atkins et al. ............ 382/260 |
| 2003/0053708 A1 * | 3/2003 | Kryukov et al. .......... 382/261 |
| 2003/0053711 A1 * | 3/2003 | Kim ....................... 382/268 |
| 2005/0117036 A1 * | 6/2005 | Nishi et al. .............. 348/241 |
| 2005/0117812 A1 * | 6/2005 | Nishi et al. .............. 382/268 |
| 2005/0281458 A1 * | 12/2005 | Adams et al. ............ 382/162 |
| 2006/0104538 A1 * | 5/2006 | Izumi ..................... 382/275 |
| 2009/0060370 A1 * | 3/2009 | Pedersen ................. 382/261 |

FOREIGN PATENT DOCUMENTS

| | | |
|---|---|---|
| JP | 9-186993 | 7/1997 |
| JP | 10-164576 | 6/1998 |
| JP | 10-191335 | 7/1998 |
| JP | 11-317943 | 11/1999 |
| JP | 2003141532 A | 5/2003 |

OTHER PUBLICATIONS

Patent Abstracts of Japan, Publication No. 09-186993, Publication date Jul. 15, 1997, 16 pages.

Patent Abstracts of Japan, Publication No. 10-191335, publication date Jul. 21, 1998, 20 pages.

Patent Abstracts of Japan, Publication No. 10-164576, Publication date Jun. 19, 1998, 12 pages.

Patent Abstracts of Japan, Publication No. 11-317943, Publication date Nov. 16, 1999, 13 pages.

Notification of Reasons for Refusal issued by the Japanese Paten Office for Application No. 2004-329260, mailed on Oct. 23, 2009 (4 pages).

esp@cenet Patent Abstract for Japanese Publication No. 2003141532, publication date May 16, 2003. (1 page).

* cited by examiner

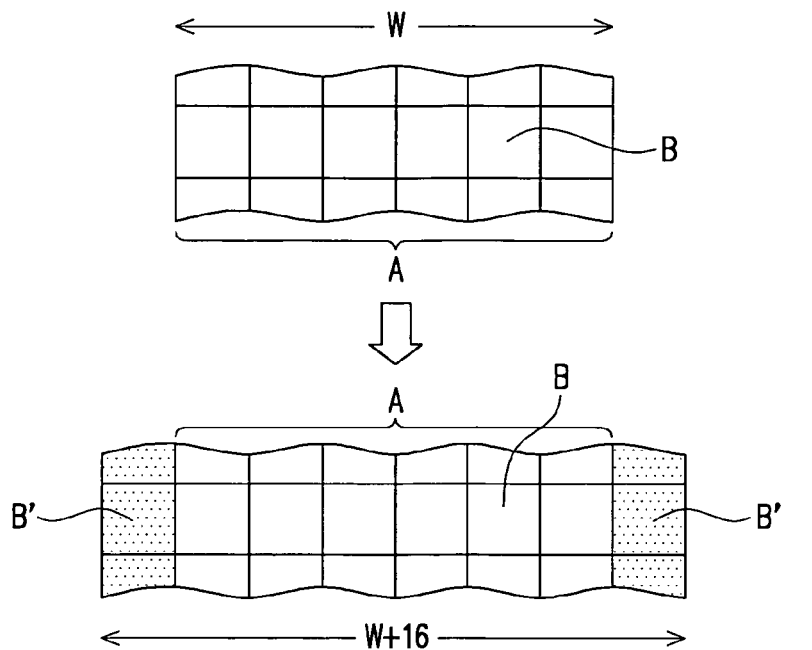
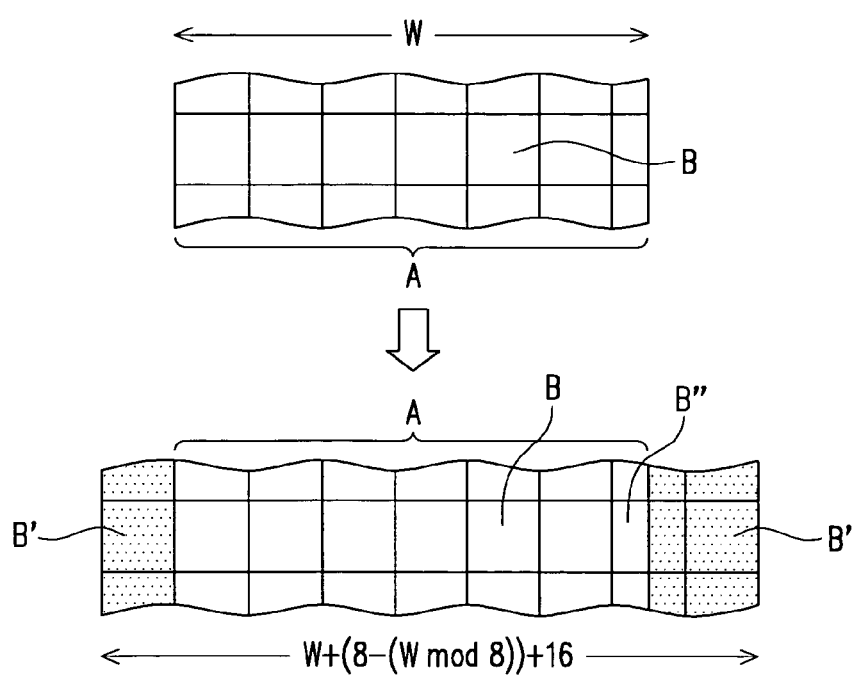

| B | | | | | | C | D | E | | | | | | | |
|---|---|---|---|---|---|---|---|---|---|---|---|---|---|---|---|
| 84 | 84 | 84 | 85 | 85 | 86 | 86 | 86 | 131 | 96 | 46 | 11 | 8 | 36 | 82 | 113 | 140 | 145 |
| 73 | 74 | 75 | 78 | 81 | 83 | 85 | 86 | 121 | 91 | 48 | 19 | 19 | 50 | 94 | 126 | 138 | 143 |
| 64 | 65 | 67 | 69 | 72 | 75 | 77 | 78 | 104 | 82 | 51 | 32 | 39 | 72 | 113 | 142 | 134 | 139 |
| 68 | 68 | 66 | 65 | 63 | 61 | 60 | 69 | 83 | 70 | 54 | 48 | 62 | 93 | 128 | 153 | 129 | 134 |
| 80 | 76 | 71 | 65 | 58 | 52 | 47 | 44 | 62 | 58 | 56 | 61 | 79 | 106 | 134 | 153 | 123 | 129 |
| 81 | 78 | 73 | 67 | 61 | 55 | 51 | 48 | 44 | 48 | 56 | 70 | 89 | 110 | 129 | 141 | 118 | 124 |
| 68 | 68 | 68 | 69 | 70 | 71 | 72 | 72 | 32 | 40 | 55 | 74 | 92 | 108 | 118 | 125 | 114 | 121 |
| 54 | 56 | 62 | 70 | 78 | 85 | 91 | 94 | 25 | 36 | 55 | 75 | 93 | 104 | 110 | 113 | 112 | 119 |
| 127 | 92 | 65 | 80 | 124 | 144 | 116 | 75 | 33 | 49 | 75 | 101 | 119 | 125 | 124 | 122 | 153 | 148 |
| 102 | 70 | 48 | 67 | 106 | 118 | 89 | 61 | 48 | 62 | 84 | 105 | 117 | 118 | 112 | 108 | 145 | 140 |
| 78 | 49 | 36 | 58 | 88 | 87 | 57 | 28 | 63 | 76 | 94 | 109 | 116 | 112 | 102 | 96 | 133 | 126 |
| 76 | 49 | 42 | 67 | 84 | 70 | 43 | 27 | 67 | 79 | 97 | 112 | 117 | 113 | 103 | 96 | 119 | 112 |
| 95 | 66 | 60 | 84 | 89 | 63 | 44 | 48 | 63 | 76 | 96 | 113 | 121 | 118 | 110 | 105 | 107 | 102 |
| 114 | 80 | 71 | 90 | 83 | 50 | 44 | 69 | 67 | 80 | 99 | 115 | 123 | 120 | 111 | 105 | 100 | 97 |
| 120 | 80 | 65 | 79 | 63 | 26 | 33 | 76 | 82 | 93 | 108 | 120 | 121 | 113 | 101 | 93 | 97 | 96 |
| 117 | 73 | 54 | 64 | 42 | 6 | 21 | 74 | 99 | 106 | 117 | 123 | 120 | 107 | 91 | 79 | 95 | 96 |
| 103 | 91 | 75 | 62 | 55 | 58 | 68 | 73 | 104 | 101 | 93 | 77 | 63 | 69 | 90 | 110 | 81 | 95 |
| 103 | 89 | 69 | 54 | 50 | 57 | 73 | 83 | 101 | 95 | 87 | 88 | 97 | 112 | 126 | 133 | 91 | 104 |

| B | | | | | | | E | | | | | | | | |
|---|---|---|---|---|---|---|---|---|---|---|---|---|---|---|---|
| 79 | 84 | 84 | 85 | 85 | 86 | 86 | 92 | 119 | 96 | 46 | 11 | 8 | 36 | 82 | 114 | 135 | 145 |
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 75 | 70 | 54 | 48 | 62 | 93 | 128 | 143 | 136 | 134 |
| 77 | 76 | 71 | 65 | 58 | 52 | 47 | 48 | 58 | 58 | 56 | 61 | 79 | 106 | 134 | 143 | 135 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 60 | 56 | 62 | 70 | 78 | 85 | 91 | 87 | 33 | 36 | 55 | 75 | 93 | 104 | 110 | 112 | 114 | 119 |
| 119 | 92 | 65 | 80 | 124 | 144 | 116 | 78 | 42 | 49 | 75 | 101 | 119 | 125 | 124 | 128 | 146 | 148 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 106 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 73 | 54 | 64 | 42 | 6 | 21 | 73 | 95 | 106 | 117 | 123 | 120 | 107 | 91 | 85 | 92 | 96 |
| 102 | 91 | 75 | 62 | 55 | 58 | 68 | 78 | 92 | 101 | 93 | 77 | 63 | 69 | 90 | 100 | 80 | 95 |
| 102 | 89 | 69 | 54 | 50 | 57 | 73 | 85 | 96 | 95 | 87 | 88 | 97 | 112 | 126 | 126 | 100 | 104 |

FIG. 10A

| 79 | 84 | 84 | 85 | 85 | 86 | 86 | 92 | 119 | 96 | 46 | 11 | 8 | 36 | 82 | 114 | 136 | 145 |
|---|---|---|---|---|---|---|---|---|---|---|---|---|---|---|---|---|---|
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 76 | 70 | 54 | 48 | 62 | 93 | 128 | 143 | 135 | 134 |
| 77 | 76 | 71 | 65 | 58 | 52 | 47 | 48 | 58 | 58 | 56 | 61 | 79 | 106 | 134 | 143 | 130 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 60 | 56 | 62 | 70 | 78 | 85 | 91 | 87 | 33 | 36 | 55 | 75 | 93 | 104 | 110 | 112 | 114 | 119 |
| 119 | 92 | 65 | 80 | 124 | 144 | 116 | 75 | 42 | 49 | 75 | 101 | 119 | 125 | 124 | 128 | 146 | 148 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 105 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 73 | 54 | 64 | 42 | 6 | 21 | 73 | 95 | 106 | 117 | 123 | 120 | 107 | 91 | 85 | 92 | 96 |
| 102 | 91 | 75 | 62 | 55 | 58 | 68 | 78 | 97 | 101 | 93 | 77 | 63 | 69 | 90 | 100 | 90 | 95 |
| 102 | 89 | 69 | 54 | 50 | 57 | 73 | 85 | 96 | 95 | 87 | 88 | 97 | 112 | 126 | 126 | 100 | 104 |

FIG. 10B

| 78 | 82 | 82 | 84 | 84 | 85 | 86 | 92 | 117 | 95 | 46 | 13 | 10 | 39 | 84 | 116 | 136 | 145 |
|---|---|---|---|---|---|---|---|---|---|---|---|---|---|---|---|---|---|
| 74 | 74 | 75 | 78 | 81 | 83 | 85 | 92 | 109 | 91 | 48 | 19 | 19 | 50 | 94 | 122 | 137 | 143 |
| 68 | 65 | 67 | 69 | 72 | 75 | 77 | 83 | 94 | 82 | 51 | 32 | 39 | 72 | 113 | 135 | 137 | 139 |
| 68 | 68 | 66 | 65 | 63 | 61 | 60 | 64 | 76 | 70 | 54 | 48 | 62 | 93 | 128 | 143 | 135 | 134 |
| 77 | 76 | 71 | 65 | 58 | 52 | 47 | 48 | 58 | 58 | 56 | 61 | 79 | 106 | 134 | 143 | 130 | 129 |
| 83 | 78 | 73 | 67 | 61 | 55 | 51 | 48 | 46 | 48 | 56 | 70 | 89 | 110 | 129 | 134 | 124 | 124 |
| 74 | 68 | 68 | 69 | 70 | 71 | 72 | 66 | 40 | 40 | 55 | 74 | 92 | 108 | 118 | 121 | 118 | 121 |
| 69 | 54 | 64 | 72 | 82 | 88 | 92 | 80 | 36 | 39 | 59 | 80 | 98 | 109 | 114 | 117 | 121 | 125 |
| 108 | 82 | 61 | 75 | 114 | 133 | 106 | 74 | 42 | 49 | 73 | 97 | 113 | 119 | 119 | 122 | 138 | 141 |
| 95 | 70 | 48 | 67 | 106 | 118 | 89 | 56 | 51 | 62 | 84 | 105 | 117 | 118 | 112 | 115 | 138 | 140 |
| 74 | 49 | 36 | 58 | 88 | 87 | 57 | 40 | 60 | 76 | 94 | 109 | 116 | 112 | 102 | 103 | 126 | 126 |
| 73 | 49 | 42 | 67 | 84 | 70 | 43 | 36 | 63 | 79 | 97 | 112 | 117 | 113 | 103 | 102 | 113 | 112 |
| 90 | 66 | 60 | 84 | 89 | 63 | 44 | 50 | 63 | 76 | 96 | 113 | 121 | 118 | 110 | 106 | 106 | 102 |
| 108 | 80 | 71 | 90 | 83 | 50 | 44 | 64 | 70 | 80 | 99 | 115 | 123 | 120 | 111 | 105 | 100 | 97 |
| 112 | 80 | 65 | 79 | 63 | 26 | 33 | 71 | 83 | 93 | 108 | 120 | 121 | 113 | 101 | 95 | 96 | 96 |
| 108 | 78 | 60 | 67 | 39 | 18 | 29 | 73 | 93 | 102 | 110 | 116 | 114 | 102 | 99 | 90 | 92 | 96 |
| 103 | 87 | 70 | 61 | 51 | 52 | 63 | 78 | 95 | 101 | 97 | 85 | 75 | 81 | 96 | 102 | 92 | 97 |
| 102 | 89 | 69 | 54 | 50 | 57 | 73 | 85 | 96 | 95 | 87 | 88 | 97 | 112 | 126 | 126 | 100 | 104 |

METHOD FOR REDUCING NOISE IN IMAGES

CROSS REFERENCE TO RELATED APPLICATION

This application claims priority from Japanese Patent Application No. 2004-329260, which is incorporated herein by reference.

BACKGROUND OF THE INVENTION

1. Field of the Invention

The present invention relates to a method of reducing block noise, mosquito noise and other noises in an image, which noises are caused at the time of decoding encoded, compressed image data on a block-by-block.

2. Related Art

In order to produce a highly compressed image data, an orthogonally transformation encoding as a highly effective image data compression technique is generally employed. This technique in summary involves dividing an input image signal into blocks of such as 8×8 pixels by a blocking circuit, subjecting the divided blocks to an orthogonal transformation process by an orthogonal transformation circuit to generate a frequency component signal, subjecting the orthogonally transformed data to a linear quantization process by a quantization circuit using a predetermined quantization step width, and allocating a variable length code to the result of the quantization by a variable-length encoding circuit to generate an encoded image signal. This orthogonal transform includes such as discrete Fourier transform, Walsh-Hadamard transform, Karhunen-Loevel transform and discrete cosine transform (DCT). Of them, the DCT is most widely used.

On the other hand, in a decoding apparatus for regenerating an image signal corresponding to the input image signal from the encoded image signal generated by the above compression encoding apparatus, the encoded image signal is subjected to variable length decoding by a variable-length decoding circuit, and reverse quantization is performed by a reverse-quantization circuit using a predetermined quantization step width and the image signal is regenerate by reverse orthogonal transform.

Herein, the orthogonal transform and the quantization which are both nonreversible transform contain errors in the regenerated image signal obtained by the decoding apparatus. Particularly, quantization errors in quantization and reverse quantization deteriorate the quality of the regenerated image. The larger the quantization step width (or the larger the compression rate), the greater the number of quantization errors caused and hence the more noticeable the deterioration of the quality of the regenerated image signal. Image deteriorations inherent to such orthogonal transform include block noise and mosquito noise, the former resulting from discontinuity along the boundary of adjacent blocks which is perceived like a mosaic appearance, the latter being perceived like swarms of mosquitoes clustered around a contour of a character or a figure on the background of the image (hereinafter referred simply to "a contour"), due to encoding and decoding on a block-by-block.

In general, these image noises are reduced by filtering image data and then smoothing the same, as described in Japanese Patent Application Laid-open Nos. 1996-205157, 1997-186993, 1998-191335, 1998-164576 and 1999-317943. These image noise reducing processes are in certain senses achieved by deterioration of an original image, thus causing an adverse effect of lowering the quality of an image to a greater or lesser extent or blurring an image. Therefore, it is general to set the extent or intensity of the image noise reduction in a filtering process so as to balance the effect of the image noise reduction and the influence of the image deterioration by the filtering process.

Meanwhile, when an image is outputted to output media such as by printing out a photo using a photo-processing apparatus, or printing out an image using a printer of an ink jet recording type or thermal transfer recording type, a variety of output sizes such as so-called L-size (127 mm×89 mm), 2 L-size (127 mm×178 mm) and 4 L-size (127 mm×254 mm) are appropriately selected so that an image data is subjected to a data expansion/reduction process according to the output size as selected. This data expansion/reduction process is performed by applying a given calculation (a kind of filtering process) to pixel data of each pixel and its peripheral pixels. These image noise reducing process and data expansion/reduction process are independently made according to their different purposes and therefore any consideration on mutual influences or interdependences are not taken into account.

According to such independent processing, when output media is to be observed, the distance between the output media and an observer (an observation distance) is varied depending on the output size. More specifically, the smaller the output size, the shorter the observation distance; and the larger the output size, the longer the observation distance. For example, in comparison between the output media of the L-size and the output media of 4 L-size, the output media of the 4-L size is observed from a far distance than the output media of the L-size is observed.

That is, as described above, according to a conventional image noise reducing method that performs a constant filtering process irrespective of the output size (i.e., a conventional image noise reducing method designed based on the assumption that output media is observed from a constant distance), the extent of the image noise reduction tends to be visually perceived (hereinafter referred simply as "perceived") as significant or an image tends to be perceived as blurred for a small output size since it is observed from a near distance. On the other hand, the extent of the image noise reduction tends to be perceived as insignificant or an image tends to be perceived as an image with insufficient noise reduction applied thereto or with image noises insufficiently reduced for a large output size. Thus, a problem arises that even the same image may be differently perceived depending on the output size.

In consideration of the above problem, it is an object of the present invention to provide a method of reducing noise in images that is capable of allowing the extent of the image noise reduction applied to image data to be perceived in a similar fashion, irrespective of the output size.

SUMMARY OF THE INVENTION

According to the present invention, there is provided a method of reducing block noise, mosquito noise and other image noises in an image by a filtering process using a smoothing filter, which block noise, mosquito noise and other image noises being caused at the time of decoding encoded, compressed image data on a block-by-block basis. The method includes changing the extent or intensity of the image noise reduction in the filtering process in a continuous or stepwise manner according to an output size or expansion rate of an image to be outputted to printer paper, photographic paper or other output media, thereby allowing the extent or intensity of the image noise reduction to be increased as the output size or expansion rate of the image increases.

According to the above image noise reducing method, the filtering is made so as to decrease the extent or intensity of the image noise reduction for a small output size or expansion rate, which decrease is compensated by a visual effect to allow the extent or intensity of the image noise reduction to be perceived as significant since it is observed from a near distance. Thus, the extent or intensity of the image noise reduction is perceived as moderate in actual circumstances. On the other hand, the filtering is made so as to increase the extent or intensity of the image noise reduction for a large output size or expansion rate, which increase is suppressed by a visual effect to allow the extent or intensity of the image noise reduction to be perceived as insignificant since it is observed from a far distance. Thus, the extent or intensity of the image noise reduction is perceived as moderate in actual circumstances.

In order to change the extent or intensity of the image noise reduction in the filtering step, it is possible to change the filtering coefficient of a smoothing filter or changing the size of a smoothing filter. Specifically, the filtering coefficient or size of the smoothing filter is decreased for a small output size or expansion rate. On the other hand, the filtering coefficient or size of the smoothing filter is increased for a large output size or expansion rate. Since the filtering coefficient can be continuously or stepwisely changed, the extent or intensity of the image noise reduction can also be changed continuously or stepwisely. On the other hand, the size of the smoothing filter is only stepwisely changed since it takes only an integer, and therefore the extent or intensity of the image noise reduction in the filtering step can be only stepwisely changed.

Preferably, the image noise reducing method of the present invention further includes: dividing each of luminance component image data and color-difference component image data of the image data into blocks corresponding to the blocks created in the encoding and decoding of the image data; applying a first filtering step to the luminance component image data with each of pixels on the boundaries of the blocks being designated as a target pixel, thereby creating a first luminance component image data with the boundaries of the blocks smoothened; performing a second filtering step with each pixel of the first luminance component image data being designated as a target value, thereby creating a second luminance component image data with its entirety smoothened; creating edge image data by subtracting each pixel value of the second luminance component image data from a corresponding pixel value of the first luminance component image data; creating corrected edge image data with each difference value of the edge image data corrected under given conditions; creating a third luminance component image data by adding each offset value of the corrected edge image data to its corresponding pixel value of the second luminance component image data; applying a third filtering step to the color-difference component image data with each pixel of the color-difference component image data being designated as a target pixel, thereby creating a first color-difference component image data with its entirety smoothened; and changing the filtering coefficient or size of a smoothing filter used in the second filtering step, thereby changing the extent or intensity of image noise reduction in the second filtering step.

With the above image noise reducing method, the step of creating the first luminance component image data is a process for reducing block noise due to luminance difference, and the step of creating the third luminance component image data is a process for reducing mosquito noise due to color difference. Also, the step of creating the first color-difference component image data is a process for reducing both block noise due to color difference and mosquito noise due to color difference.

The block noise reducing process is first performed because if the mosquito noise reducing process, which is a kind of smoothing process, is first performed, block noise is entirely smoothed and it is hard to reduce only block noise in the subsequent block noise reducing process.

In the mosquito noise reducing process, not only the second luminance component image data is created, but also the third luminance component image data is created by combining the corrected edge image data created from the edge image data with the second luminance component image data. This is because only a small luminance difference can be smoothed while not greatly smoothing a contour of a large luminance difference, that is, mosquito noise can be reduced without deterioration of the image quality.

Then, the third luminance component image data and the first color-difference component image data are finally outputted. Thus, in the block noise reducing process, the image is previously divided into blocks and the boundaries of the blocks are smoothed. Therefore, contours on the background of an image are not erroneously recognized as boundaries and subjected to the block noise reducing process. Thus, block noise is properly reduced without deterioration of the image quality. In the mosquito noise reducing process, it is not ended up only by realizing the luminance smoothing, but the correction is applied to the image data with its luminance smoothed so that mosquito noise can be properly reduced without causing deterioration of the image quality. Thus, both block noise and mosquito noise can be properly reduced without deterioration of the image quality. Furthermore, the image noise reducing method of the present invention is performed so that the luminance component image data and the color-difference component image data are processed independently of each other. As a result, it is expected to more securely reduce image noise. In addition, the extent or intensity of the image noise reduction in the second filtering step is changed continuously or stepwisely according to the output size or expansion rate of an image, and therefore the extent or intensity of the image noise reduction can be perceived as moderate, irrespective of the output size or expansion rate, as described above.

In the image noise reducing method of the present invention, clipped values may be used in the first filtering step to have absolute values of the differences in pixel value of each pixel of the filtering range relative to the target value kept within a given threshold value. That is, the first filtering step is performed only for the boundaries of the blocks so that excessive smoothing causes an unnatural (discontinuous) blocks with the boundaries thereof blurred and hence unintentionally emphasizes block noise. In a case where an edge of one block is bright while an edge of an adjacent block is dark, the filtering process may cause excessive correction which exceeds original pixel values. The clipped values are used as the pixel value of the nearby pixels in order to avoid these problems.

In the image noise reducing method of the present invention, the corrected edge image data may be created by determining a difference from a maximum difference value and a minimum difference value in the edge image data so that where the difference is greater than a threshold value, each difference value of the edge image data is subtracted or added by a given adjusting value so as to have its absolute value decreased to 0 or greater. Where the difference is greater than the given threshold value, it indicates the possibility that a contour having a great luminance difference exists in the image and therefore mosquito noise is highly likely to have emerged. In order to address this, each difference value of the edge image data is subtracted or added by the given adjusting value so as to have its absolute value (a luminance difference at its point) decreased. All the difference values of the edge image data are designated as objects to be corrected (which means that the regions with no mosquito noise emerged are corrected), for the reason that if both regions which have been corrected and regions which have not been corrected exist in a block, its boundaries are likely to be noticeable. However, of the difference values of the edge image data, those having absolute values being equal to or lower than the given image edge adjusting value are set at "0" in order to prevent excessive correction for them.

Furthermore, in creating the corrected edge image data of the image noise reducing method of the present invention, each difference value of the edge image data may be multiplied by a given adjusting value where the difference is equal to or lower than the threshold value. For the difference being equal to or lower than the threshold value, that is a flat block with less contours existing in the image, it is not meant that there is very little possibility that mosquito noise has emerged. In order to address this, each difference value of the edge image data is multiplied by the given adjusting value to entirely reduce the luminance difference. However, the reduction ratio is set to be relatively moderate compared with a case where the difference is greater than the given threshold.

In the image noise reducing method of the present invention, the third filtering step is preferably applied to offset data created by creating difference data by calculating the difference between the pixel value of each target pixel and the pixel value of each pixel within the filtering range and clipping the difference data at an upper limit and a lower limit in a given upper-lower-limit table. According to the visual characteristics, the human eye is not sensitive to color difference. Therefore, no specific problem may arise even when the third filtering step is applied to the color-difference component image data itself. However, by first creating the offset data from the color-difference component image data and then applying the third filtering step thereto, occurrence of unnecessary color blurring can be properly prevented.

In the image noise reducing method of the present invention, the given upper-lower-limit table may be created so that for an input value having an absolute value lower than a given threshold value, this input value is designated as an output value, and for an input value having an absolute value equal to or greater than the given threshold value, a threshold value of the same code as that of this input value is designated as an output value.

As described above, according to the image noise reducing method of the present invention, the extent or intensity of the image noise reduction in the filtering process is changed in a continuous or stepwise manner according to an output size or expansion rate of an image to be outputted to printer paper, photographic paper or other output media, thereby allowing the extent or intensity of the image noise reduction to be increased as the output size or expansion rate of the image increases. Accordingly, the filtering is made so as to decrease the extent or intensity of the image noise reduction for a small output size or expansion rate, which decrease is compensated by a visual effect to allow the extent or intensity of the image noise reduction to be perceived as significant since it is observed from a near distance. On the other hand, the filtering is made so as to increase the extent or intensity of the image noise reduction for a large output size or expansion rate, which increase is suppressed by a visual effect to allow the extent or intensity of the image noise reduction to be perceived as insignificant since it is observed from a far distance. Thus, the extent or intensity of the image noise reduction is perceived as moderate in actual circumstances, irrespective of the output size or expansion rate.

Since the extent or intensity of the image noise reduction in the filtering process is changed according to the output size or expansion rate, the extent or intensity of the image noise reduction is differently perceived as long as the observation distance is constant. However, in actual circumstances, the observation distance is varied depending on the output size or expansion rate, and therefore images outputted are finished so as to be perceived in a similar fashion, irrespective of the output size or expansion rate.

BRIEF DESCRIPTION OF THE DRAWINGS

The above, and other objects, features and advantages of the present invention will become apparent from the detailed description thereof in conjunction with the accompanying drawings wherein.

FIG. 3A illustrates the relationship between the filtering coefficient of a filter and the output size of an image, and FIG. 3B illustrates the relationship between the filter size of a filter and the output size of an image.

FIGS. 6A and 6B are explanatory views illustrating a state in which boundary lines have been added to image data along the horizontal axis. Specifically, FIG. 6A illustrates a case in which the width of the image data is a multiple of the width of a block, and FIG. 6B illustrates a case in which the width of the image data is not a multiple of the width of a block.

FIG. 7A illustrates a case in which the height of the image data is a multiple of the height of a block, and FIG. 7B illustrates a case in which the height of the image data is not a multiple of the height of the block.

FIGS. 8A and 8B are flowcharts of the block noise reducing process of FIG. 4, in which FIG. 8A is for a luminance component image data and FIG. 8B for a color-difference component image data.

FIGS. 9A and 9B are explanatory views of the block noise reducing process in the vertical direction of FIG. 8A, in which FIG. 9A illustrates a state in which a filtering process is to be performed and FIG. 9B illustrates a state in which vertical block noise has been reduced.

FIGS. 10A and 10B are explanatory views of the block noise reducing process in the horizontal direction of FIG. 8A, in which FIG. 10A illustrates a state in which a filtering process is to be performed and FIG. 10B illustrates a state in which horizontal block noise has been reduced.

FIGS. 12A-12E are explanatory views of the block noise reducing process to the color-difference component image data of FIG. 8B, in which FIG. 12A: color-difference component image data, FIG. 12B: difference value data, FIG. 12C: offset data, FIG. 12D: offset data and FIG. 12E illustrates a state in which the pixel value of a target pixel has been replaced.

DETAILED DESCRIPTION OF THE PREFERRED EMBODIMENT

Figure 1:
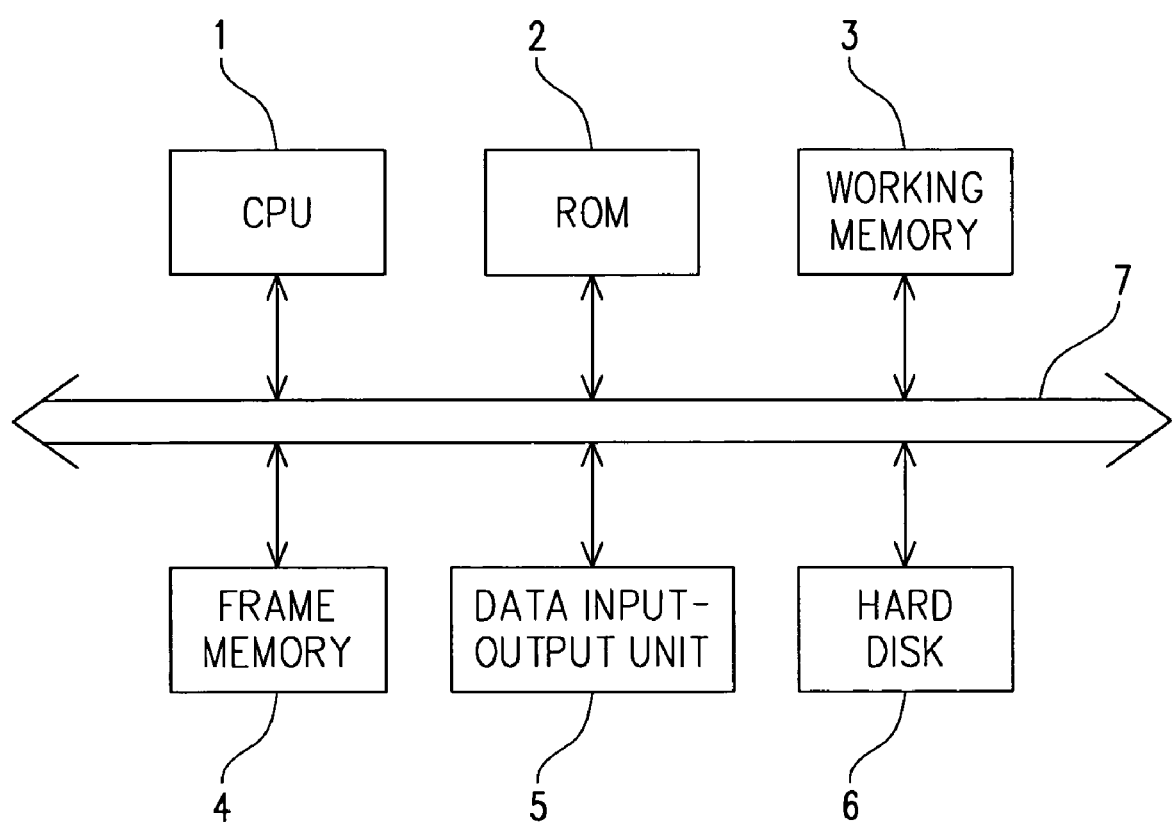
FIG. 1 is a structural view of an image processing apparatus according to one embodiment of the present invention.

Now, the description will be made for the structure of an image processing apparatus that realizes the method of reducing noise in images according to one embodiment of the present invention with reference to FIG. 1. An image processing apparatus comprises a computer with a CPU 1, a ROM 2, a working memory 3, a frame memory 4, a data input-output unit 5 and a hard disk 6, which are all connected to a bus 7. The ROM 2 serves to store an image noise reducing program, other computer programs and various parameters, while the working memory 3 that is required for realizing control by the CPU contains such as a buffer and register. The CPU 1 performs various calculations and processes based on computer programs stored in the ROM 2.

The frame memory 4 is a memory for storing image data obtained by decoding a still image compressed and encoded in JPEG format. Image data (R, G, B) inputted in the data input-output unit 5 are once stored respectively in separate frame memories 4, as R component image data, G component image data and B component image data, and then the image noise reducing process is performed. Upon the finish of the image noise reducing process, the (R, G, B) image data are outputted to the outside via the data input-output unit 5 or stored in the hard disk 6.

Figure 2:
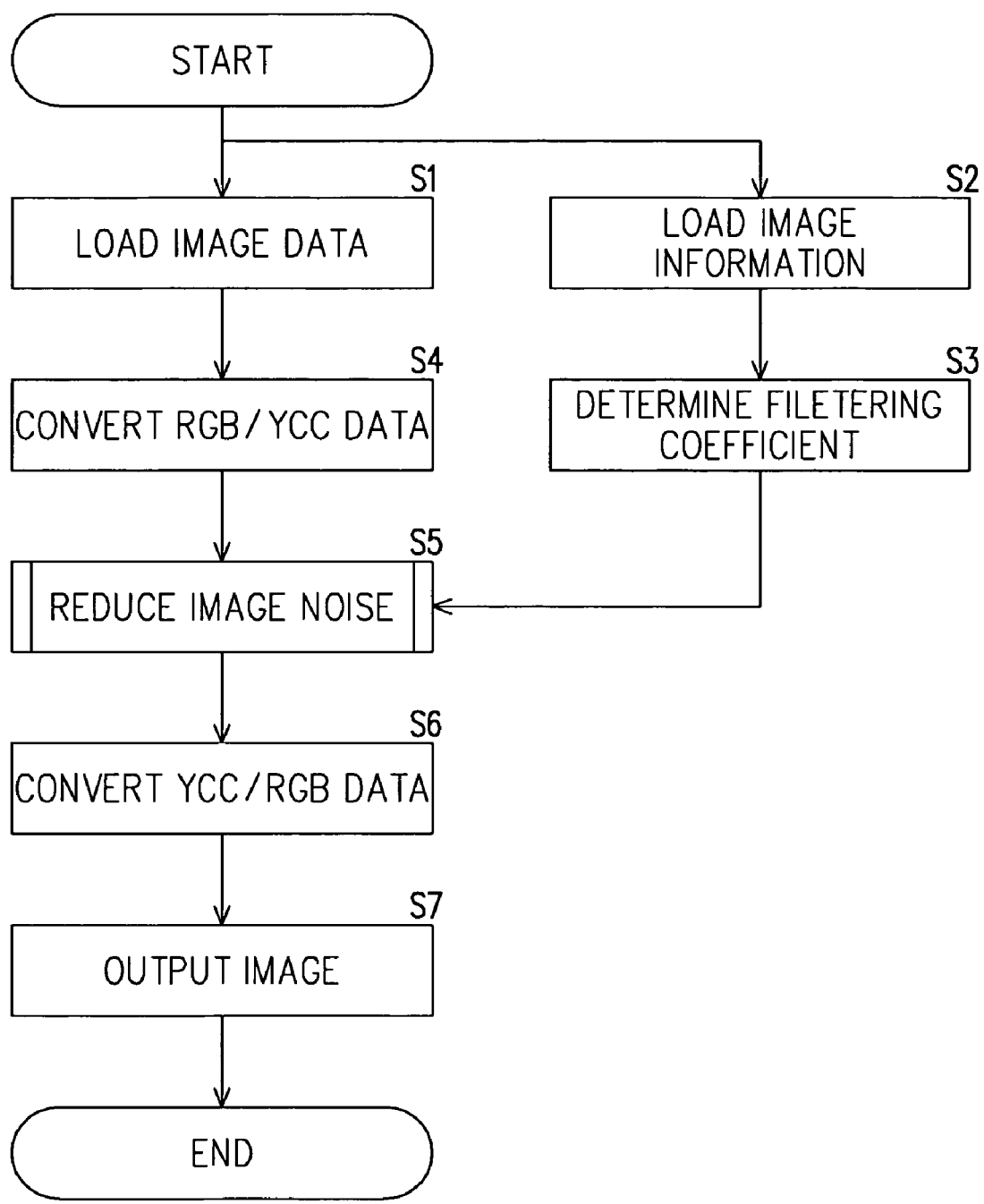
FIG. 2 is a flowchart of the image processing of this embodiment.

As illustrated in FIG. 2, in an image noise reducing process, image data recorded in a recording medium is loaded via the data input-output unit 5 (S1). In this recording medium, an Exif (Exchangeable Image File Format) file that stores input size information, output size information, expansion rate, etc. is recorded in addition to the image data, and these image information are also loaded (S2). Then, the filtering coefficient of a filter used in the image noise reducing process is determined based on the output size information of these image information (S3).

Figure 3A:
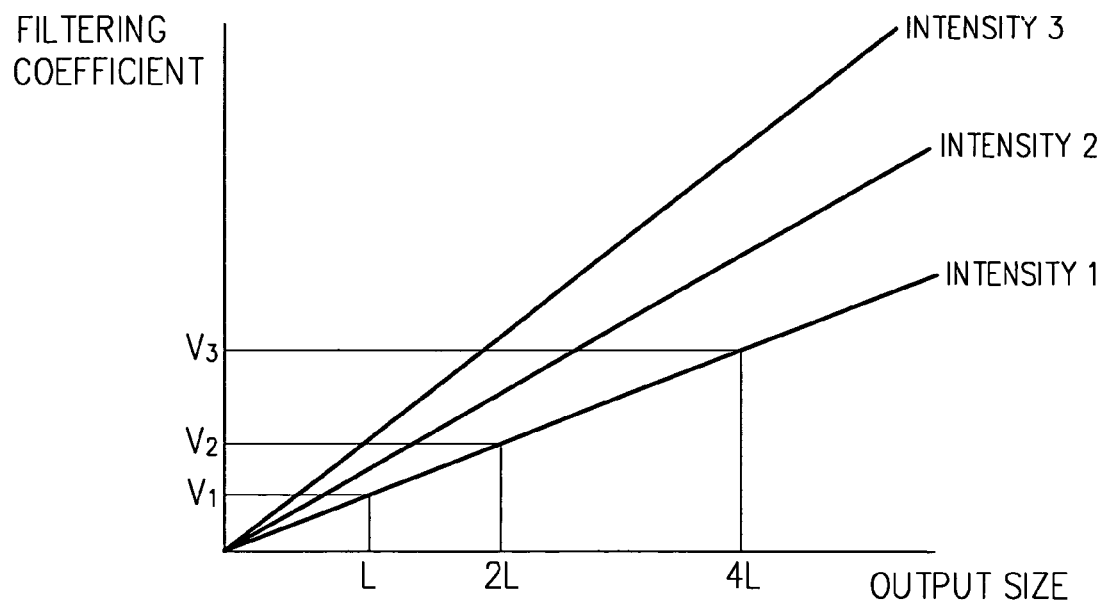
FIGS. 3A and 3B are graphs illustrating the relationship between a filter used for a filtering process for reducing noise in image of this embodiment and the output size of an image. Specifically.

As illustrated in FIG. 3A, a proportionality relation exists between the output size and the filtering coefficient so that the smaller the output size, the smaller the filtering coefficient; and the greater the output size, the greater the filtering coefficient. For the relationship between the output size and the filtering coefficient, three types (intensity of 1, 2 and 3) are prepared, respectively having different slopes. The operator can select any one of these three types of relationship when determining the filtering coefficient. For example, on the assumption that the intensity of 1 is selected, the filtering coefficient is $V_1$ for the L-size, $V_2$ for the 2-L size, and $V_3$ for the 4-L size.

Referring back to FIG. 2, an RGB/YCC data conversion process (S4) is performed with respect to the loaded image data, and then an image noise reducing process for block noise and mosquito noise (S5) is performed. The filtering coefficient determined in S3 is reflected during the image noise reducing process of S5. In the RGB/YCC data conversion process, the (R, G, B) image data are color converted into (Y, Cr, Cb) image data based on the following equations (Eq. 1-Eq. 3). The reason why the data are converted into YCC color space is that block noise and mosquito noise are generated when the JPEG format performs compression/expansion in YCC color space, and therefore correction accuracy is improved when the image noise reducing process is performed in the same color space.

$$Y=(RToY[0][0]\times R+RToY[0][1]\times G+RToY[0][2]\times B)/10000 \quad (1)$$

$$Cr=(RToY[1][0]\times R+RToY[1][1]\times G+RToY[1][2]\times B)/10000+2048 \quad (2)$$

$$Cb=(RToY[2][0]\times R+RToY[2][1]\times G+RToY[2][2]\times B)/10000+2048 \quad (3)$$

RToY[i][j]:YCrCb conversion coefficient

Upon the finish of the image noise reducing process (S5), a YCC/RGB data conversion process (S6) is performed based on the following equations (Eq. 4-Eq. 6) to return the (Y, Cr, Cb) image data to the (R, G, B) image data. Thus, a series of the processes are finished. Then, an image is outputted from a photo-processing apparatus, or outputted from a printer of an ink jet recording type or thermal transfer recording type (S7).

$$R=(YToR[0][0]\times Y+YToR[0][1]\times (Cr-2048)+YToR[0][2]\times (Cb-2048)/10000 \quad (4)$$

$$G=(YToR[1][0]\times Y+YToR[1][1]\times (Cr-2048)+YToR[1][2]\times (Cb-2048)/10000 \quad (5)$$

$$B=(YToR[2][0]\times Y+YToR[2][1]\times (Cr-2048)+YToR[2][2]\times (Cb-2048)/10000 \quad (6)$$

YToR[i][j]:YC coupling coefficient

In this embodiment, in order to limit data loss due to the above processing, the density data format is upgraded from 8 bit to 12 bit, although it is possible to keep the density data format in 8 bit.

Figure 4:
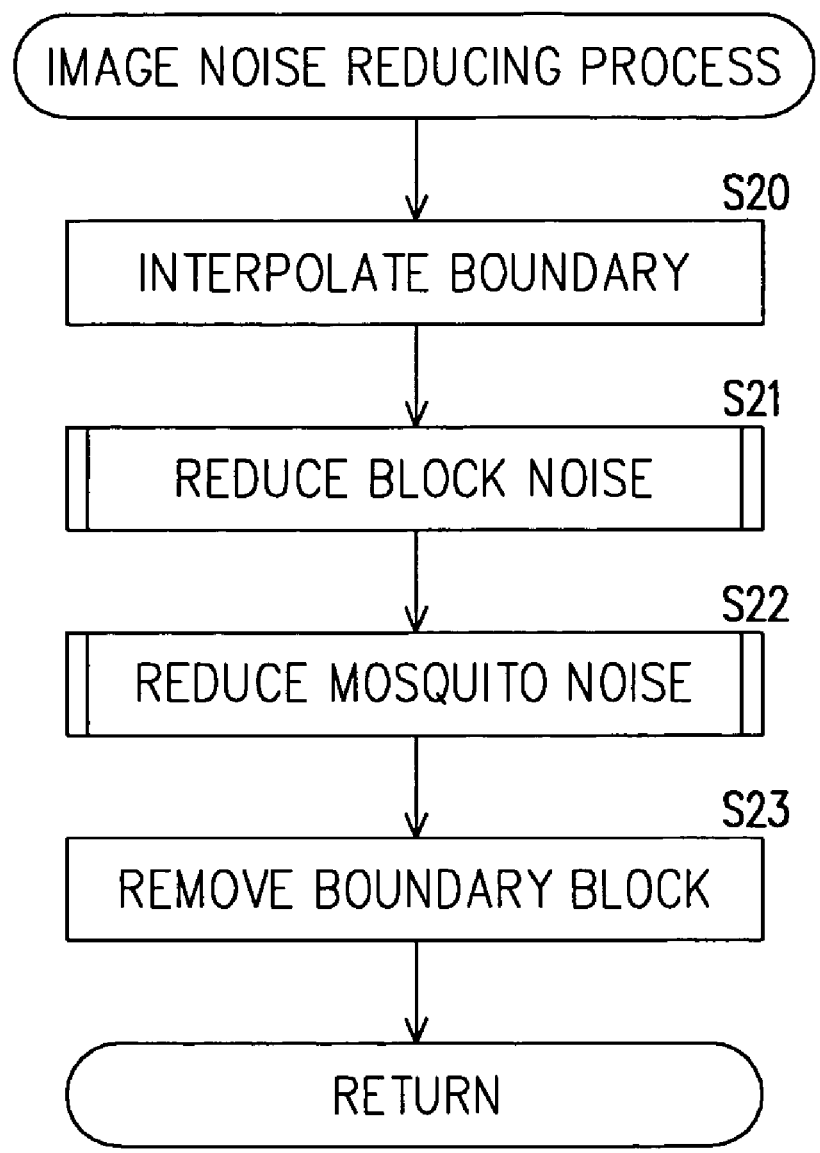
FIG. 4 is a flowchart of an image noise reducing process of FIG. 2.

As illustrated in FIG. 4, in the image noise reducing process of S2, a boundary interpolation step (S20) is performed, and then a block noise reducing step (S21) and a mosquito noise reducing step (S22) are subsequently performed. The boundary interpolation step (S20) is performed for the purpose of interpolating pixel data on the boundaries of the blocks of the image data at the time of performing a later-described filtering step to three image data sets (Y-image data of (Y, Cr, Cb) image data (hereinafter referred to "luminance component image data"), Cr-image data and Cb-image data (hereinafter respectively referred to "color-difference component image data")).

Figure 5:
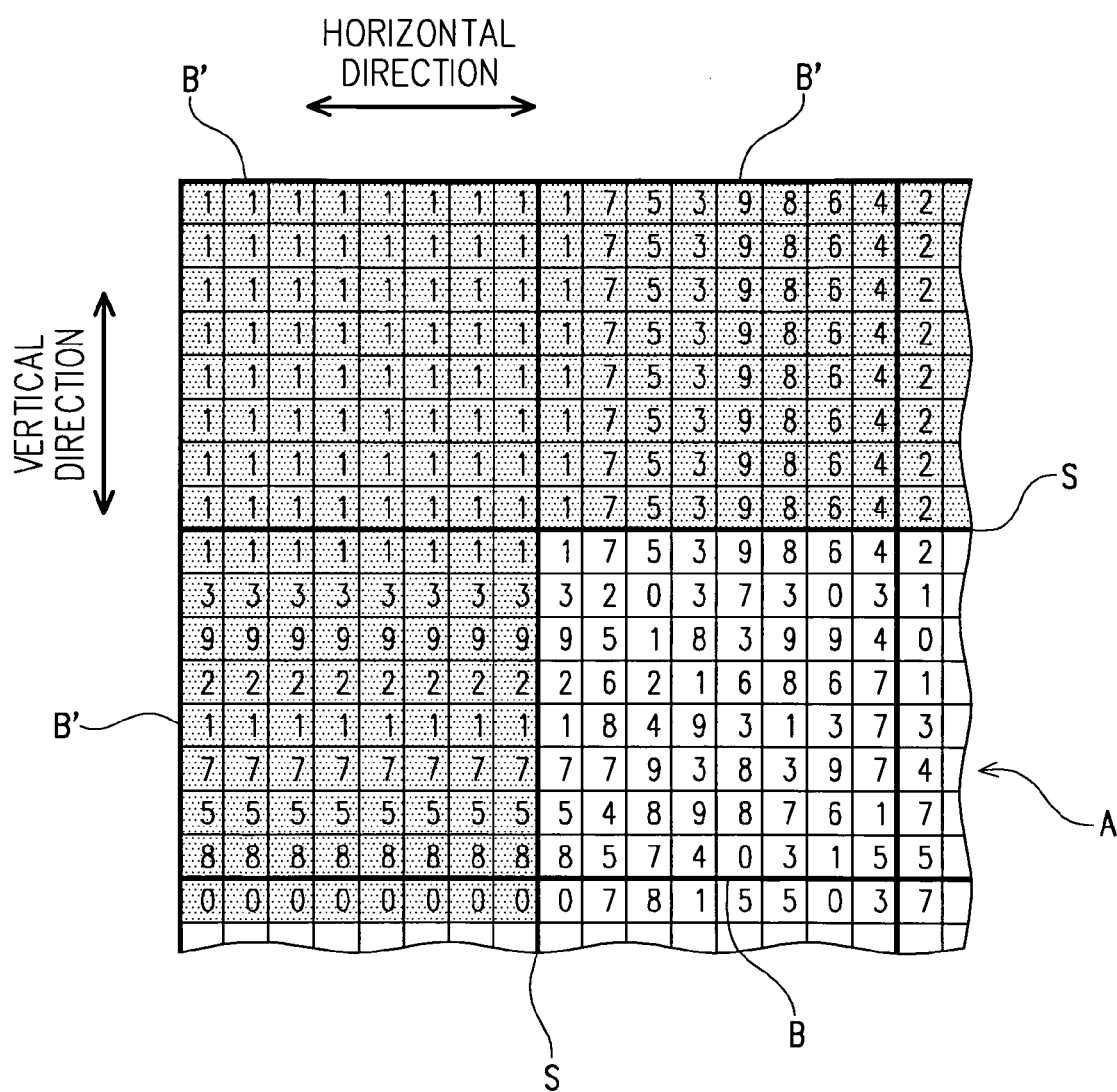
FIG. 5 is an explanatory view illustrating a state in which boundary lines have been added to image data.

Specifically, as illustrated in FIG. 5, which illustrates any one of the image data sets (each grid and a numerical value in each grid respectively representative of a pixel and a pixel value), the boundary interpolation step (S20) adds to boundaries S of blocks B to be encoded and decoded (non-hatched blocks defined with thick frame) of image data A (a non-hatched portion), blocks B' (hatched blocks defined with thick frame) each having the same size as the size of each block B respectively in the vertical and horizontal directions, and embeds the pixel values of the pixels on the boundaries of the image data A in the grids (pixel values) of the blocks B'. These added blocks B' are removed in a boundary block removing step (S23) upon the finish of the block noise reducing step (S21) and the mosquito noise reducing step (S22).

As illustrated in FIG. 6A, in a case where the length (number of pixels) W of the image data A along the horizontal axis is a multiple of the width (number of pixels) of the block B along the horizontal axis, or a multiple of 8, the blocks B' are added so as to allow each row to have an overall length (number of pixels) of [W+16]. Otherwise (when not a multiple of 8), the blocks B' and a surplus are added so as to allow each row to have an overall length (number of pixels) of [W+(8−(W mod 8))+16], thus achieving data interpolation to a surplus B" of the multiple of 8, as illustrated in FIG. 6B.

Figure 7A:
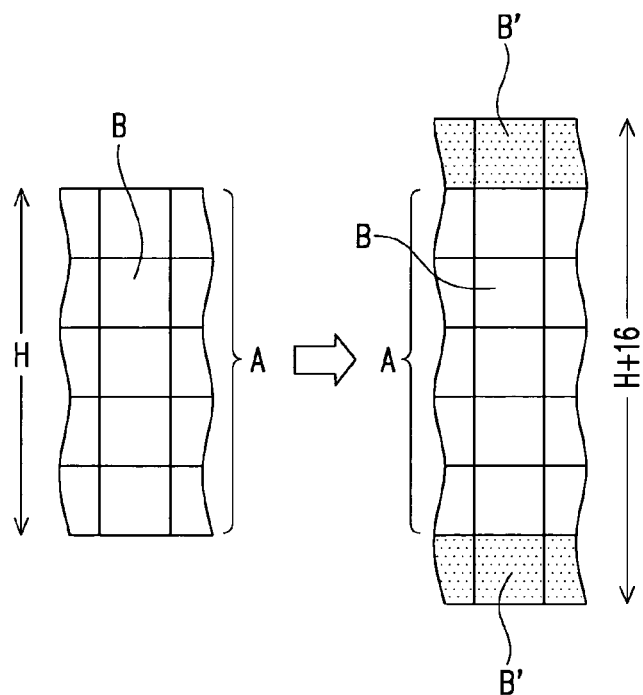
FIGS. 7A and 7B are explanatory views illustrating a state in which boundary lines have been added to image data along the vertical axis. Specifically.
Figure 7B:
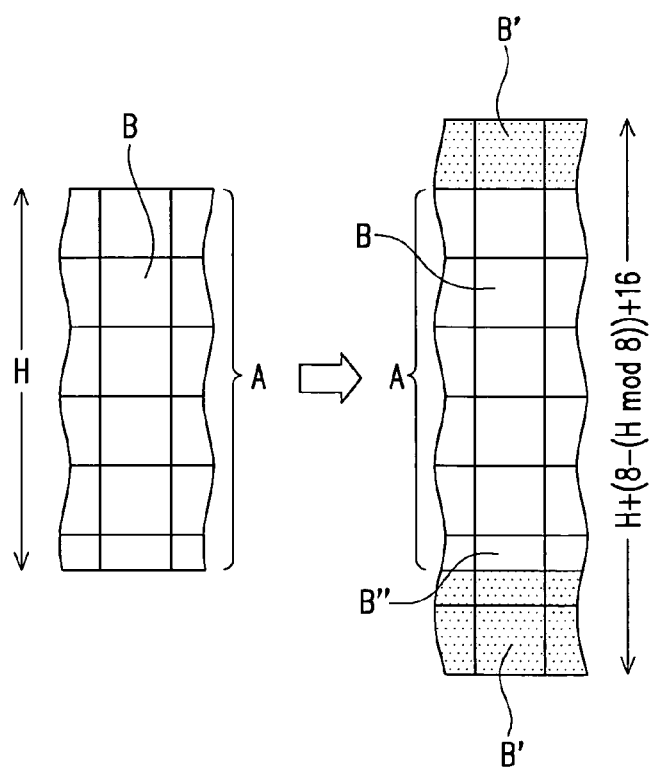

Similarly, as illustrated in FIG. 7A, in a case where the length (number of pixels) H of the image data A along the vertical axis is a multiple of the length (number of pixels) of the block B along the vertical axis, or a multiple of 8, the blocks B' are added so as to allow each column to have an overall length (number of pixels) of [H+16]. Otherwise (when not a multiple of 8), the blocks B' and a surplus are added so as to allow each column to have an overall length (number of pixels) of [H+(8−(H mod 8))+16], thus achieving data interpolation to a surplus B" of the multiple of 8, as illustrated FIG. 7B.

Figure 8A:
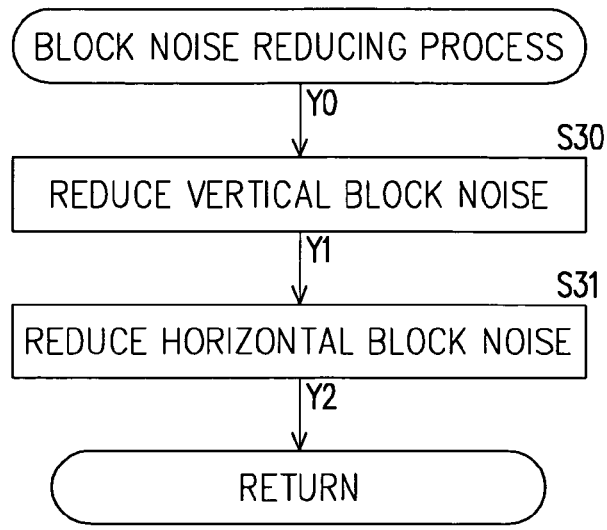
Figure 8B:
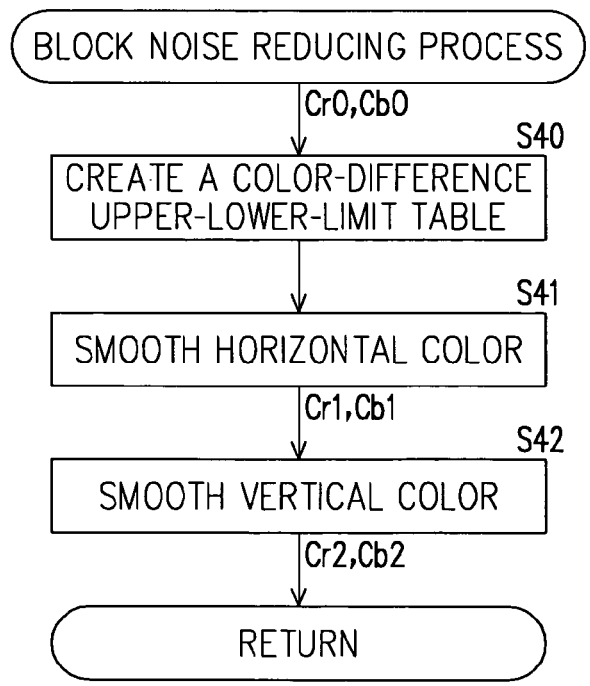

The block noise reducing step (S21) is to create luminance component image data Y1 for luminance component image data Y0 by performing a vertical block noise reducing step (S30) and then create luminance component image data Y2 (first luminance component image data of the present invention) by performing a horizontal block noise reducing step (S31), as illustrated in FIG. 8A. On the other hand, as illustrated in FIG. 8B, for each of color-difference component image data Cr0, Cb0, a color-difference upper-lower-limit table creation step (S40) is performed. Then, a horizontal color smoothing step (S41) is performed to create color-difference component image data Cr1, Cb1, and then a vertical color smoothing step (S42) is performed to create color-difference component image data Cr2, Cb2 (first color-difference component image data of the present invention).

The Vertical Block Noise Reducing Step (S30)

A one-dimensional filter in a horizontal direction is applied to image data with a pixel on the boundaries of the blocks being designated as a target pixel, thereby creating the luminance component image data Y1 that has a luminance difference in the horizontal direction of luminance component image data Y0 eliminated or smoothed in the boundaries of the blocks. The filter size can be set to such as 3 pixels or 5 pixels (see FIG. 9A, in which a dense dot pattern C, a thin dot pattern D and a thinner dot pattern E respectively represent a target pixel, a filtering range and pixels to be filtered), and a filtering step (a first filtering step of the present invention) is performed by using the following equation (Eq. 7).

$$Y1 = \frac{\sum Fb \times Yi}{\sum Fb} \quad (7)$$

This filter is a weighting filter by matrix Fb (e.g., Fb=(1 3 1)) in which a coefficient to a target value is about 10-20 times greater than a coefficient to the other pixels, and is made based on an equation in which coefficients of the matrix Fb are respectively multiplied by pixel values (Yi) within the filtering range with the target pixel C designated as the center and the results are summed up, and then the sum is divided by the sum of the coefficients of the matrix Fb.

The above filtering process, targets of which are only the boundaries between the blocks, may cause an unnatural (discontinuous) block with the boundaries thereof blurred and hence unintentionally emphasize block noise when smoothing is excessively made, and may cause excessive correction which exceeds original pixel values in a case where an edge of one block is bright while an edge of an adjacent block is dark. In order to avoid this problem, in the above equation (Eq. 7), clipped (gap-processed) values are used to meet the requirements of the following equation (Eq. 8 ), that is, to have absolute values of the differences in pixel value relative to the target value C kept within a threshold value b.

$$Yi[x,y]-b \leq Yi'[x-1,y] \leq Yi[x,y]+b \quad (8)$$

The threshold value b is for example 30 so that the pixel values of pixels E on the boundaries of the blocks are converted from the values of FIG. 9A into the values of FIG. 9B, from which it has been found that the difference in pixel value (luminance difference) in the boundaries of the blocks became smaller.

The Horizontal Block Noise Reducing Step (S31)

A one-dimensional filter in a vertical direction is applied to image data with a pixel on the boundaries of the blocks being designated as a target pixel, thereby creating the luminance component image data Y2 that has a luminance difference in the vertical direction of the luminance component image data Y1 eliminated or smoothed in the boundary of the blocks. The processing is substantially the same as in the vertical block noise reducing step.

The threshold value b is for example 30 so that the pixel values of pixels E on the boundaries of the blocks are converted from the values of FIG. 10A into the values of FIG. 10B, from which it has been found that the difference in pixel value (luminance difference) in the boundaries of the blocks became smaller.

Thus, the above two block noise reducing steps are performed for the purpose of reducing the luminance difference in the boundaries of the blocks both in the vertical and horizontal directions by finally creating the luminance component image data Y2 (FIG. 10B) from the luminance component image data Y0 (FIG. 9A). According to the visual characteristics, the human eye is very sensitive to the luminance difference and therefore block noise results mainly from the luminance difference among pixels on the boundaries of the blocks. In light of this, the above two block noise reducing steps are very effective processes that can reduce block noise. However, block noise results not only from the luminance difference but also from the color difference to some extent. In order to completely reduce block noise resulting from these differences, the following color smoothing steps (S41, S42) will be needed.

The Color-Difference Upper-Lower-Limit Table Creation Step (S40)

In the color smoothing steps, a relatively large filter (hereinafter described) is used so that where excessive smoothing is made, colors are blurred. For example, where color smoothing is made in great span extending for example from a red of the lips to the skin of a person in image data, the colors are blurred. In order to avoid this problem, the color-difference upper-lower-limit table is used in the color smoothing steps (S41, S42).

Figure 11:
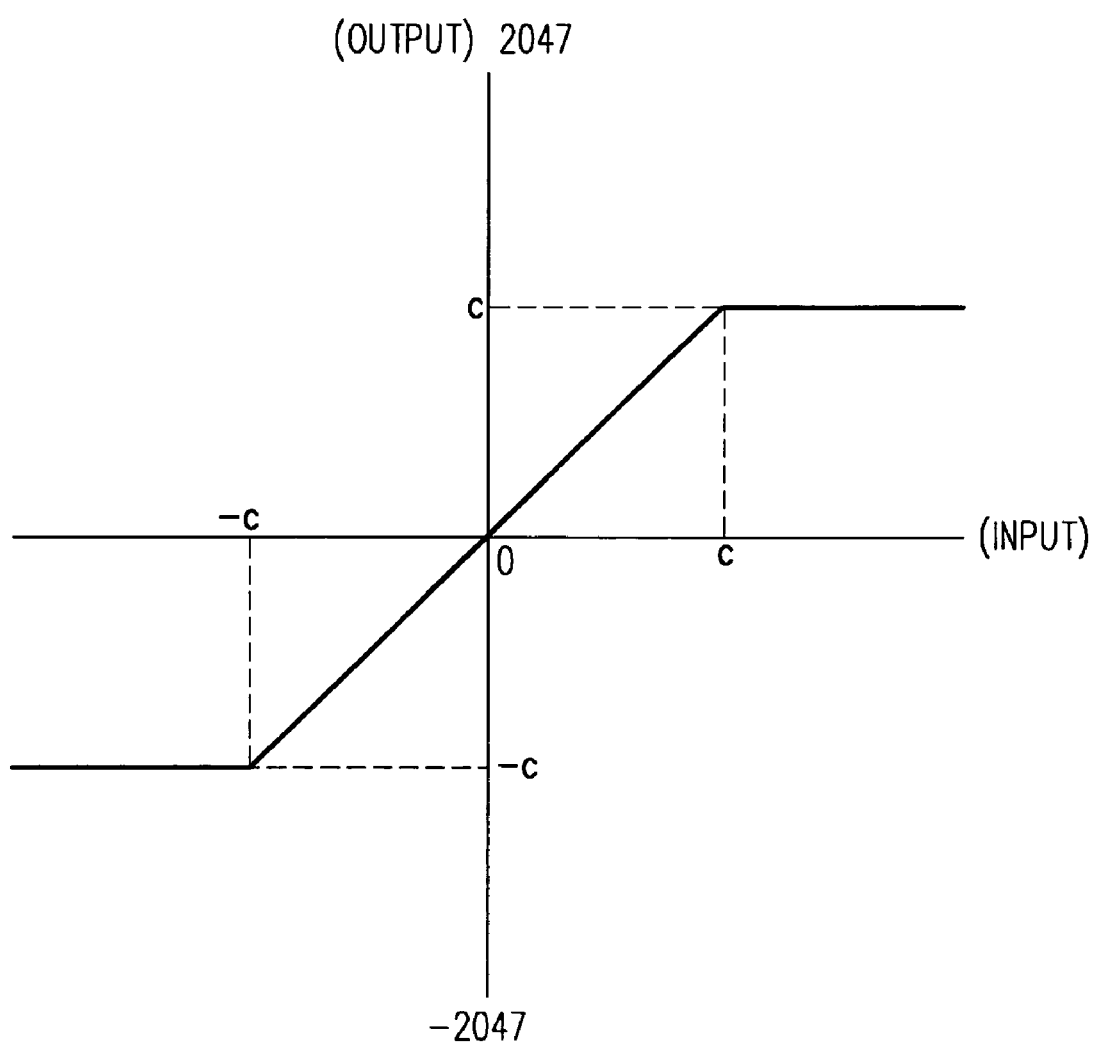
FIG. 11 is an explanatory view of an upper-lower-limit table of the color difference for use in the block noise reducing process to the color-difference component image data of FIG. 8B.

The color-difference upper-lower-limit table is a table for calculation of mask values (see FIG. 11). A reference code "c" represents a threshold value for the upper and lower limits of an output color difference, and lies in the range of 0-4095. According to this table, for input values falling in the range of −c to c, the corresponding or equivalent values are outputted, while for input values lower than −c, all are set to −c and then this −c is outputted.

The Horizontal Color Smoothing Step (S41)

A one-dimensional filter in a horizontal direction is applied to image data with each pixel of a block being designated as a target pixel, thereby creating color-difference component image data Cr1, Cb1, each having colors of color-difference component image data Cr0, Cb0 smoothed in the horizontal direction. The filter size can be set to such as 7 pixels (see FIG. 12A, in which a thick frame C represents a target pixel).

Figure 12A:
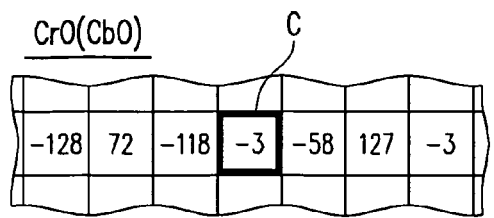
Figure 12B:
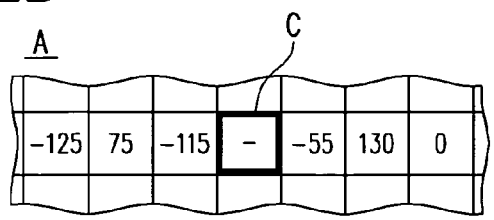
Figure 12C:
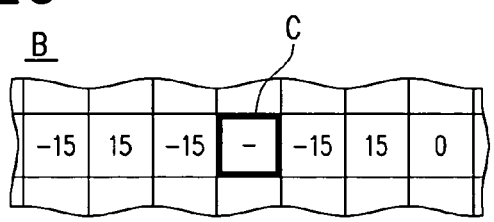
Figure 12D:
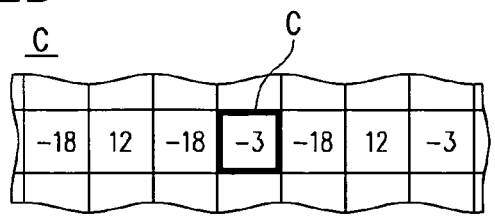
Figure 12E:
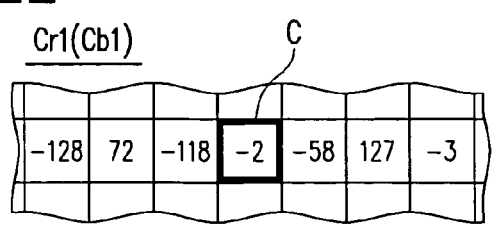

Upon calculation of the difference (−2047 to 2047) between the target pixel C and a nearby pixel, difference data (A) is created (FIG. 12B). Then, offset data (B) is created by having this difference data (A) clipped at an upper limit and a lower limit in the upper-lower-limit table (a threshold value c: e.g., 15) (FIG. 12C). Then, upon creation of offset data (C) by returning the pixel value of a target pixel C to the target pixel C of this offset data (B) (FIG. 12D), a filtering step (a third filtering step of the present invention) is performed by using the following equation (Eq. 9) (FIG. 12E).

$$Cr1, Cb1 = \frac{\sum Fc \times Ci}{\sum Fc} \tag{9}$$

This filter is a moving average filter by matrix Fc (Fc= (1 1 ... 1)) having an equal coefficient, and is made based on an equation in which the coefficient of the matrix Fc is multiplied by respective offset values (Ci) with the target pixel C designated as the center and the results are summed up, and the sum is divided by the sum of the coefficients of the matrix Fc (this moving average filter necessitates the sum of the coefficients to be equal to the filter size). This filtering step is performed for every pixel.

The Vertical Color Smoothing Step (S42)

A one-dimensional filter in a vertical direction is applied to image data with each pixel of a block being designated as a target pixel, thereby creating color-difference component image data Cr2, Cb2, each having colors of color-difference component image data Cr1, Cb1 smoothed in the vertical direction. The processing is substantially the same as in the horizontal color smoothing step.

Thus, the above two color smoothing steps are performed for the purpose of smoothing or losing only small color differences while leaving a contour having a large color difference unsmoothed by finally creating the color-difference component image data Cr2, Cb2 from the color-difference component image data Cr0, Cb0 (FIG. 12A). That is, where no upper and lower limits are provided for the magnitude of the color difference, smoothing is made based on a normal moving average, thereby causing a contour having a large color difference to be blurred. Instead, where a threshold value c is set so as to have upper and lower limits lying in the fluctuation range of the magnitude of a small color difference, the magnitude of a color difference resulting from a contour having a large color difference located in the periphery is transformed to lie in the fluctuation range of the magnitude of a small color difference of a contour so as to prevent the contour having a large color difference from being blurred. Block noise due to color difference is caused by this small color difference and therefore the above two color smoothing steps are very effective processes that can reduce block noise due to color difference with no deterioration of the image quality or with making deteriorated image quality non-noticeable. The adjustment of intensity is made by properly setting the filter size of each filter and the threshold value of the upper-lower-limit table.

Figure 13:
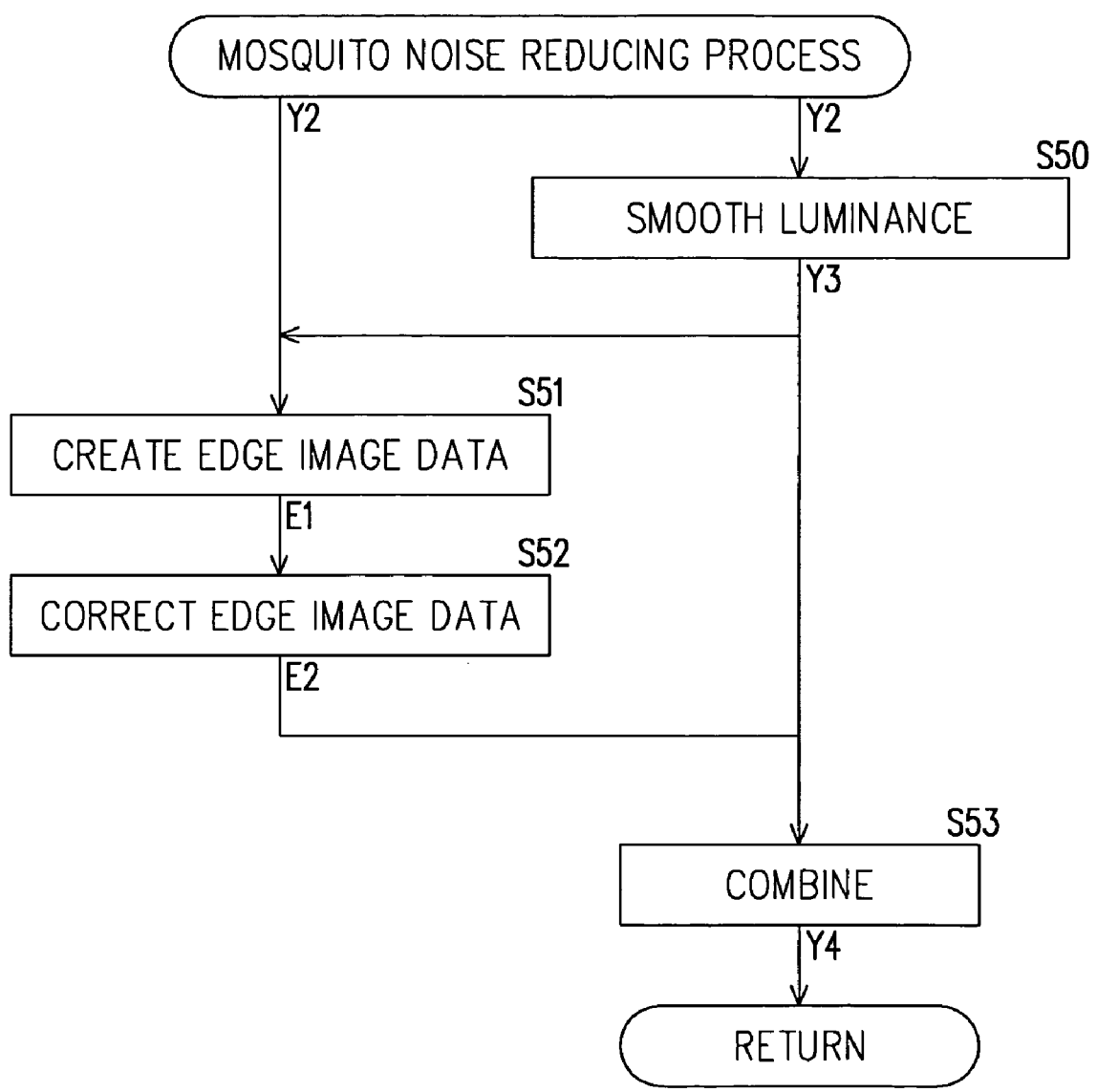
FIG. 13 is a flowchart of the mosquito noise reducing process of FIG. 4.

As illustrated in FIG. 13, the mosquito noise reducing step (S22) is to create luminance component image data Y3 (second luminance component image data of the present invention) by performing a luminance smoothing step (S50) for the luminance component image data Y2 created in the block noise reducing step of S21, then create edge image data E1 by performing an edge image data creation step (S51) based on the luminance component image data Y2, then create corrected edge image data E2 by performing edge image data correction step (S52) and then finally create luminance component image data Y4 (third luminance component image data of the present invention) by combining this corrected edge image data E2 with the luminance component image data Y3 in a step (S53).

The Luminance Smoothing Step (S50)

A two-dimensional filter is applied to image data with each pixel of a block being designated as a target pixel, thereby creating the luminance component image data Y3 that has a luminance of the luminance component image data Y2 smoothed. The filter size can be set to such as 3 by 3 pixels or 5 by 5 pixels. A filtering step (a second filtering step of the present invention) is performed by using the following equation (Eq. 10).

$$Y3 = Y2 + \left(\frac{\sum Fb \times Yi}{\sum Fb} - Y2\right) \times (d/128) \tag{10}$$

This filter is a moving average filter by matrix Fb having an equal coefficient, and is made based on an equation in which the coefficient of the matrix Fb is multiplied by respective pixel values (Yi) within the filtering range and the results are summed up; the sum is divided by the sum of the coefficients of the matrix Fb; the difference between this calculated value and the pixel value of the target pixel C is determined; this determined value is then multiplied by [d/128]; and this calculated value is added to the pixel value of the target pixel C. The "d" represents a coefficient (smoothing intensity coefficient) for adjusting the smoothing intensity, which is a filtering coefficient determined in S3. That is, this coefficient d is a variable that is determined based on the output size information in the image information having been obtained in S2. The smoothing intensity coefficient d is divided by 128 because the smoothing intensity coefficient d is previously multiplied by [128/100] for high speed processing.

The Edge Image Data Creation Step (S51)

Figure 14:
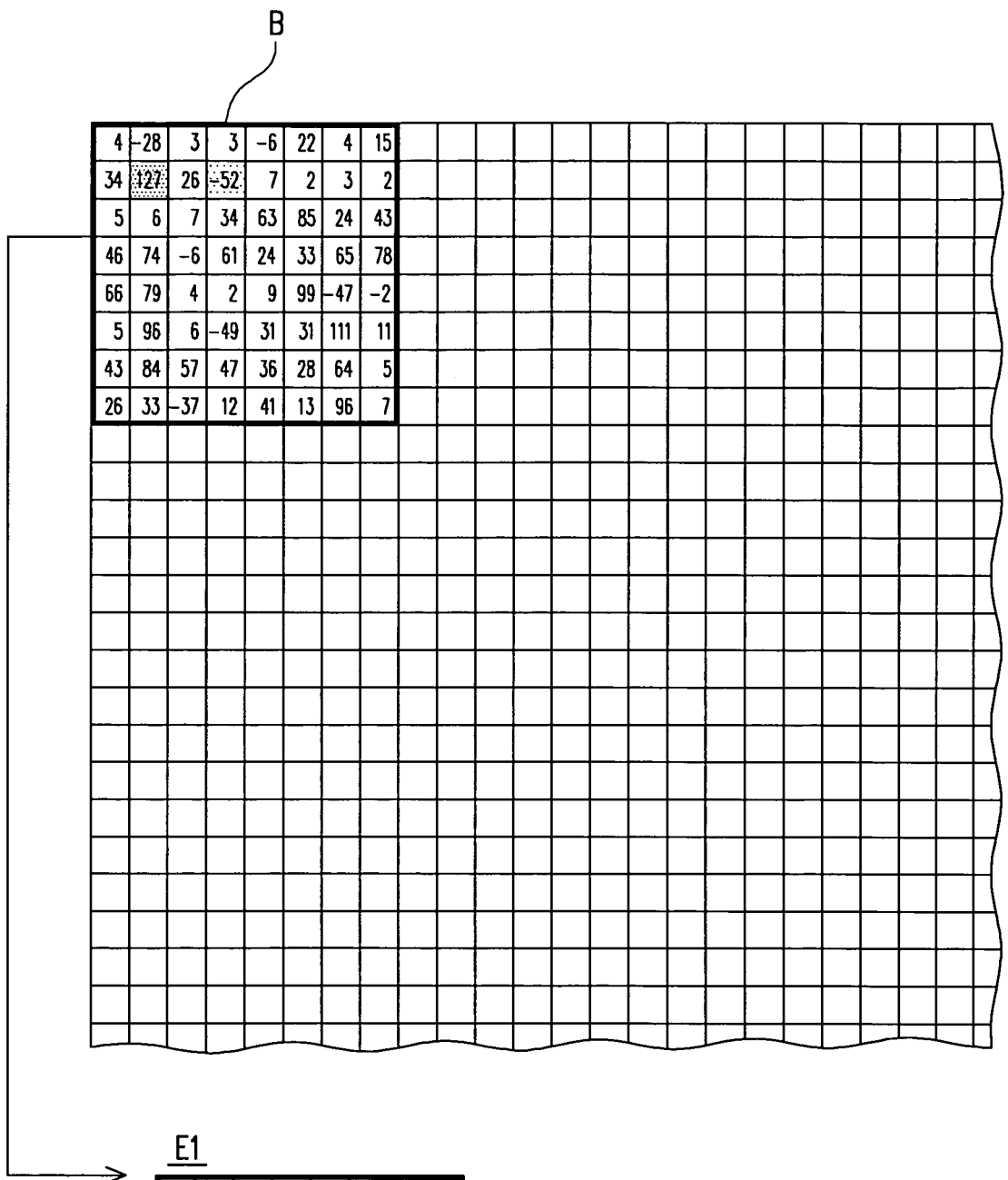
FIG. 14 is an explanatory view of the edge image creation step of FIG. 13.

The edge image data E (see FIG. 14) is created for each block B by using the following equation (Eq. 11), in which the data is clipped to the range of −2048 to 2047.

$$E1 = Y2 - Y3 \tag{11}$$

That is, the edge image data E1 is created by subtracting each pixel value of the luminance component image data Y3 created in the luminance smoothing step (S50) from a corresponding pixel value of the luminance component image data Y2.

The Edge Image Data Correction Step (S52)

A difference SA is determined from the maximum difference value and the minimum difference value in the edge image data E1 and corrected edge image data E2 is created by using the following equation (Eq. 12).

$$SA > e \rightarrow E2 = \begin{cases} E1 - f & [f < E1] \\ 0 & [|E1| \le f] \\ E1 + f & [E1 < -f] \end{cases} \tag{12}$$

$$SA \le e \rightarrow E2 = E1 \times (1/g)$$

Where the difference SA is greater than a threshold value e, it indicates the possibility that a contour having a great luminance difference exists in the image and therefore mosquito noise is highly likely to have emerged. In order to address this case based on the above equation (Eq. 12), the following calculation is made. That is, mosquito noise emerges in a region having an excessively large luminance difference and therefore each difference value of the edge image data E1 is subtracted or added by an image edge adjusting value "f" of mosquito noise so as to have its absolute value (a luminance difference at its point) decreased. All the difference values of the edge image data E1 are designated as objects to be corrected (which means that the regions with no mosquito noise emerged are also corrected), for the reason that if both regions which have been corrected and regions which have not been corrected exist in a block, its boundaries are likely to be noticeable. However, of the difference values of the edge image data E1, those having absolute values being equal to or lower than the image edge adjusting value f are set at "0" in order to prevent excessive correction for them.

For the difference SA being equal to or lower than the threshold value, that is, a flat block with less contours existing in the image, it is not meant that there is very little possibility that mosquito noise has emerged. In order to address this case based on the above equation (Eq. 12), the following calculation is made. That is, all the individual difference values of the edge image data E1 are multiplied by [1/an image edge adjusting value "g" of a normal image] to entirely reduce the luminance difference. However, the reduction ratio is set to be relatively moderate compared with a case where the difference SA is greater than the threshold value.

The threshold value e is for example 10, while the image edge adjusting value f of mosquito noise and the image edge adjusting value g of the normal image g are each for example 5. With these values applied, in a case of FIG. 14, the difference SA is 179 so that a target pixel (difference value: −4) at the upper left corner is: 4−5=−1→0 after the correction, its adjacent target pixel (difference value: −28) is: −28+5=−23, ... a target pixel (difference value: 7) at the lower right corner is: 7−5=2 after the correction. Thus, the corrected edge image E2 with the luminance differences entirely reduced is created.

The Combining Step (S53)

The luminance component image data Y4 is created by performing a combining step by using the following equation (Eq. 13), in which the data is clipped to the range of 0 to 4096.

$$Y4=Y3+E2 \qquad (13)$$

That is, the luminance component image data Y4 is created by adding each offset value of the corrected edge image data E2 created in the edge image data correction step of S52 to its corresponding pixel value of the luminance component image data Y3.

The above mosquito noise reducing process is to finally create the luminance component image data Y4 from the luminance component image data Y2, thus smoothing or losing only small luminance differences while leaving contours having a large luminance difference unsmoothed (this is because the luminance difference is originally large and therefore smoothing is not noticeable). Mosquito noise is caused by this small luminance difference and therefore the above mosquito noise reducing process is effective in reducing mosquito noise with no deterioration of the image quality or with making deteriorated image quality non-noticeable.

The image noise reducing process of this embodiment is made so that the block noise reducing step (S21) is first performed and then the mosquito noise reducing step (S22) is subsequently performed. This is because if the mosquito noise reducing step (S22), which is a smoothing process, is first performed, block noise is entirely smoothed, and it is hard to reduce only block noise in the block noise reducing step (S21). Therefore, the mosquito noise reducing step is necessarily performed after the block noise reducing step (S21).

The extent or intensity of the smoothing in the mosquito noise reducing step (S22) is varied depending on the image output size so as to be decreased for a small output size, while being increased for a large output size. Decreasing the extent or intensity of the smoothing means that the extent or intensity of the image noise reduction is decreased, while increasing the extent or intensity of the smoothing means that the extent or intensity of the image noise reduction is increased. In this regard, the observation distance tends to be decreased for a small output size, and therefore there is caused an optical effect to cause the extent or intensity of the smoothing to be perceived as significant, which effect provides compensation to a portion to which the smoothing with decreased extent or intensity has been applied, hence allowing the extent or intensity of the smoothing to be perceived as moderate. On the other hand, the observation distance tends to be increased for a large output size, and therefore there is caused an optical effect to cause the extent or intensity of the smoothing to be perceived as insignificant, which effect suppresses the significance of a portion to which the smoothing process with increased extent or intensity has been applied, hence allowing the extent or intensity of the smoothing to be perceived as moderate. Therefore, although the perception of the extent or intensity of the smoothing is necessarily varied when the observation distance is constant, this observation distance is varied depending on the output size of an image in actual circumstances, so that an image outputted can be finished so as to be visually perceived in a similar fashion regardless of the output size.

It is not necessary to limit the present invention to the above embodiment, while various modifications may be made within the scope of the present invention.

Figure 3B:
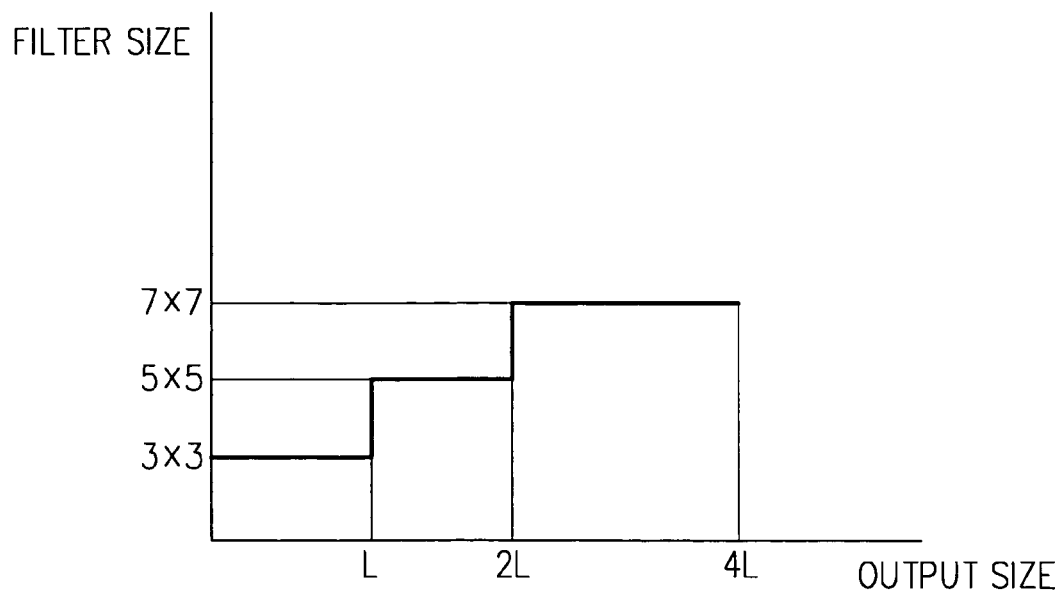

For example, in the above embodiment, the extent or intensity of the image noise reduction in the filtering process is changed by changing the filtering coefficient d of the smoothing filter in the equation (10) used in the luminance smoothing step (S50) of the mosquito noise reducing step (S22). Alternatively, the extent or intensity of the image noise reduction in the filtering process may be changed by stepwisely changing the filter size of the smoothing filter in the equation (10), as illustrated in FIG. 3B.

The changing of the filtering coefficient or the filter size is applied not only to the filters used in the mosquito noise reducing step (S22) and the luminance smoothing step (S50), but also to a filter used for the filtering process in other steps. It is however to be noted that the extent or intensity of the smoothing for the entire image depends mainly on the luminance smoothing step (S50) of the mosquito noise reducing step (S22), and therefore a more desirable result may be achieved by the above embodiment.

In the above embodiment, the image nose reducing process is performed on the computer, while it may be incorporated into a coder, allowing the coder to perform the image noise reducing process in the decoding process (more specifically after an inverse orthogonal transform has been performed).

In the above embodiment, since the RGB conversion is made at the time of decoding a compressed image, the RGB/YCC data conversion (S4) is performed. For a BMP image or the like whose input image contains RGB information, this RGB/YCC data conversion is required. However, for a JPEG image which originally contains YCC information, the RGB/YCC data conversion (S4), and the YCC/RGB data conversion (S6) to be performed therealong are not necessarily required.

This specification is by no means intended to restrict the present invention to the preferred embodiments set forth therein. Various modifications to the method of reducing noise in images, as described herein, may be made by those skilled in the art without departing from the spirit and scope of the present invention as defined in the appended claims.

What is claimed is:

1. A method of reducing block noise, mosquito noise, and other image noises in an image by a filtering process using a smoothing filter, said block noise, mosquito noise, and other image noises being caused at the time of decoding encoded, compressed image data on a block-by-block basis, the method comprising:

changing the intensity of the image noise reduction in said filtering process in a continuous or stepwise manner according to an output size of an image to be outputted to printer paper, photographic paper or other output media, thereby allowing the intensity of the image noise reduction to be increased as the output size of the image increases;

dividing each of luminance component image data and color-difference component image data of said image data into blocks corresponding to the blocks created in the encoding and decoding of the image data;

applying a first filtering step to the luminance component image data with each of pixels on the boundaries of the blocks being designated as a target pixel, thereby creating a first luminance component image data with the boundaries of the blocks smoothened;

performing a second filtering step with each pixel of the first luminance component image data being designated as a target value, thereby creating a second luminance component image data with its entirety smoothened;

creating edge image data by subtracting each pixel value of the second luminance component image data from a corresponding pixel value of the first luminance component image data;

creating corrected edge image data with each difference value of the edge image data corrected under given conditions;

creating a third luminance component image data by adding each offset value of the corrected edge image data to its corresponding pixel value of the second luminance component image data;

applying a third filtering step to the color-difference component image data with each pixel of the color-difference component image data being designated as a target pixel, thereby creating a first color-difference component image data with its entirety smoothened; and changing the filtering coefficient of the smoothing filter used in said second filtering step, thereby changing the intensity of image noise reduction in said second filtering step, wherein the above steps are performed by a processor, and the filtering process is applied to image data stored in computer memory.

2. A method of reducing block noise, mosquito noise, and other image noises in an image by a filtering process using a smoothing filter, said block noise, mosquito noise, and other image noises being caused at the time of decoding encoded, compressed image data on a block-by-block basis, the method comprising:

changing the intensity of the image noise reduction in said filtering process in a continuous or stepwise manner according to an output size of an image to be outputted to printer paper, photographic paper or other output media, thereby allowing the intensity of the image noise reduction to be increased as the output size of the image increases dividing each of luminance component image data and color-difference component image data of said image data into blocks corresponding to the blocks created in the encoding and decoding of the image data;

applying a first filtering step to the luminance component image data with each of pixels on the boundaries of the blocks being designated as a target pixel, thereby creating a first luminance component image data with the boundaries of the blocks smoothened;

performing a second filtering step with each pixel of the first luminance component image data being designated as a target value, thereby creating a second luminance component image data with its entirety smoothened;

creating edge image data by subtracting each pixel value of the second luminance component image data from a corresponding pixel value of the first luminance component image data;

creating corrected edge image data with each difference value of the edge image data corrected under given conditions;

creating a third luminance component image data by adding each offset value of the corrected edge image data to its corresponding pixel value of the second luminance component image data;

applying a third filtering step to the color-difference component image data with each pixel of the color-difference component image data being designated as a target pixel, thereby creating a first color-difference component image data with its entirety smoothened; and changing the size of the smoothing filter used in said second filtering step, thereby changing the intensity of image noise reduction in said second filtering step, wherein the above steps are performed by a processor, and the filtering process is applied to image data stored in computer memory.

3. The method of reducing block noise, mosquito noise and other image noises according to claim 1, wherein clipped values are used in the first filtering step to have absolute values of the differences in pixel value of each pixel of the filtering range relative to the pixel value of the target pixel kept within a given threshold value.

4. The method of reducing block noise, mosquito noise and other image noises according to claim 1, wherein the corrected edge image data is created by determining a difference from a maximum difference value and a minimum difference value in the edge image data so that where the difference is greater than a threshold value, each difference value of the edge image data is subtracted or added by a given adjusting value so as to have its absolute value decreased to 0 or greater.

5. The method of reducing block noise, mosquito noise and other image noises according to claim 4, wherein each difference value of the edge image data is multiplied by a given adjusting value where said difference is equal to or lower than the threshold value.

6. The method of reducing block noise, mosquito noise and other image noises according to claim 1, wherein the third filtering step is applied to offset data created by creating difference data by calculating the difference between the pixel value of each target pixel and the pixel value of each pixel within the filtering range and clipping the difference data at an upper limit and a lower limit in a given upper-lower-limit table.

7. The method of reducing block noise, mosquito noise and other image noises according to claim 6, wherein the given upper-lower-limit table is created so that for an input value having an absolute value lower than a given threshold value, said input value is designated as an output value, and for an input value having an absolute value equal to or greater than the given threshold value, a threshold value of the same code as that of said input value is designated as an output value.

* * * * *